employees# United States Patent
Fu et al.

(10) Patent No.: US 8,612,792 B2
(45) Date of Patent: Dec. 17, 2013

(54) POWER MEASUREMENT DEVICE

(75) Inventors: Ying-Bin Fu, Shenzhen (CN); Ting Ge, Shenzhen (CN); Ya-Jun Pan, Shenzhen (CN)

(73) Assignees: Hong Fu Jin Precision Industry (ShenZhen) Co., Ltd., New Taipei (TW); Hon Hai Precision Industry Co., Ltd., New Taipei (TW)

( * ) Notice: Subject to any disclaimer, the term of this patent is extended or adjusted under 35 U.S.C. 154(b) by 160 days.

(21) Appl. No.: 13/278,104

(22) Filed: Oct. 20, 2011

(65) Prior Publication Data
US 2013/0024714 A1 Jan. 24, 2013

(30) Foreign Application Priority Data
Jul. 20, 2011 (CN) .......................... 2011 1 0203619

(51) Int. Cl.
G06F 1/00 (2006.01)
G01R 21/00 (2006.01)
G01R 7/00 (2006.01)

(52) U.S. Cl.
USPC ................ 713/340; 702/60; 702/61; 702/62; 702/63; 702/64; 324/141

(58) Field of Classification Search
USPC .......... 324/141; 702/60–64; 73/340; 713/340
See application file for complete search history.

(56) References Cited

U.S. PATENT DOCUMENTS

| | | | |
|---|---|---|---|
| 7,361,142 B2 * | 4/2008 | Suda .............................. 600/300 |
| 7,925,901 B2 * | 4/2011 | Felter et al. ..................... 713/300 |
| 7,983,860 B2 * | 7/2011 | Schuette ......................... 702/60 |
| 8,041,521 B2 * | 10/2011 | Bletsch et al. .................. 702/60 |
| 8,421,443 B2 * | 4/2013 | Bitsch et al. .................. 324/127 |
| 8,443,213 B2 * | 5/2013 | Sun .............................. 713/300 |
| 2013/0111231 A1 * | 5/2013 | Chen et al. .................... 713/300 |

* cited by examiner

Primary Examiner — Brian Misiura
(74) Attorney, Agent, or Firm — Altis Law Group, Inc.

(57) ABSTRACT

A device to measure power consumption includes a processor connected to a central processing unit (CPU) and a memory module, a switch for setting the power measurement device to measure either the power supplied to the CPU or the power supplied to the memory, and a display to show the results of such measurements.

16 Claims, 1 Drawing Sheet

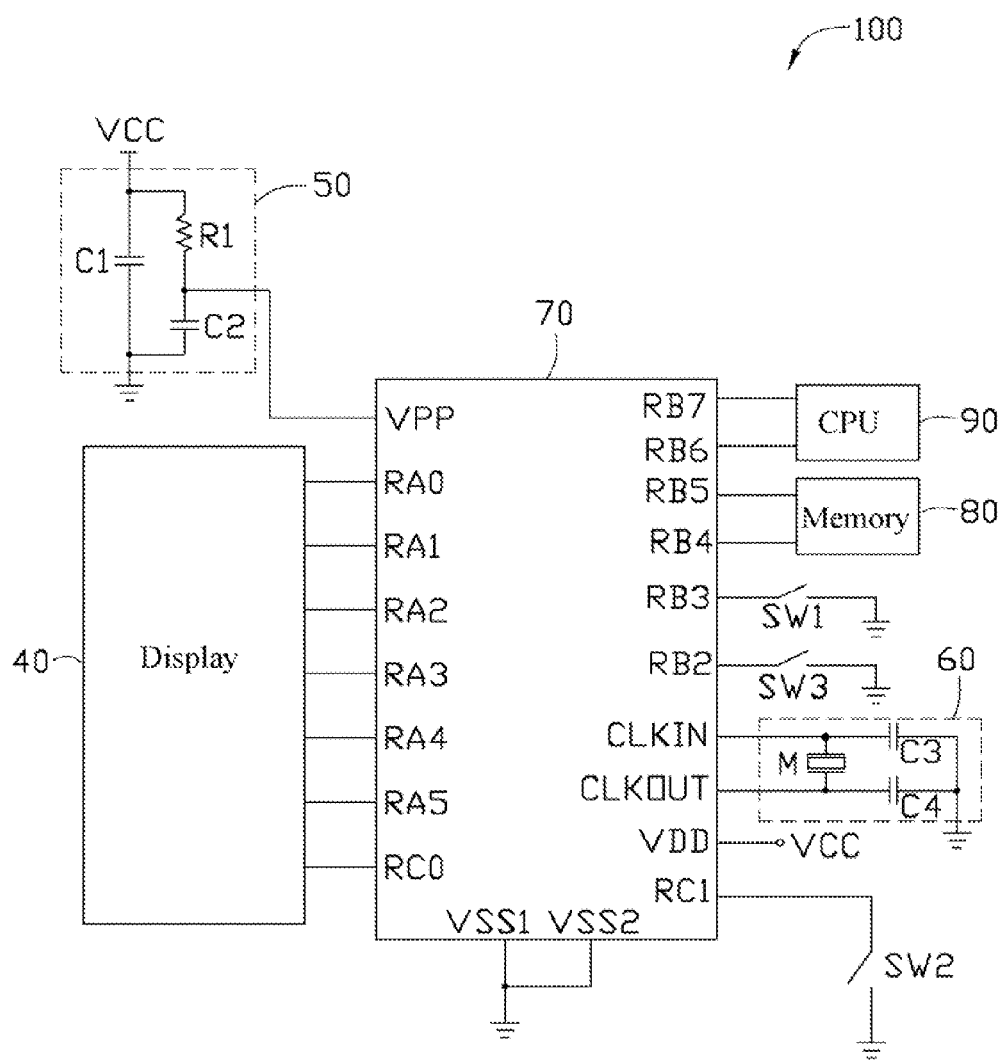

POWER MEASUREMENT DEVICE

BACKGROUND

1. Technical Field

The present disclosure relates to a power measurement device.

2. Description of Related Art

The power supplied to components of an electronic device are usually obtained by multiplying a measured voltage and a measured current using a multimeter. However, the measurements taken by the multimeter is often inefficient and inaccurate. Therefore, there is room for improvement in the art.

BRIEF DESCRIPTION OF THE DRAWING

Many aspects of the embodiments can be better understood with reference to the drawing. The components in the drawing are not necessarily drawn to scale, the emphasis instead being placed upon clearly illustrating the principles of the present embodiments.

The FIGURE shows a circuit diagram of a power measurement device in an exemplary embodiment.

DETAILED DESCRIPTION

The disclosure, including the accompanying drawing, is illustrated by way of example and not by way of limitation. It should be noted that references to "an" or "one" embodiment in this disclosure are not necessarily to the same embodiment, and such references mean at least one.

Referring to the FIGURE, an exemplary embodiment of a power measurement device 100 for measuring the power P1 consumed by a central processing unit (CPU) 90 and the power P2 consumed by a memory 80. The measurement device 100 includes a processor 70, a clock generator 60, a filter 50, a display 40, a power supply VCC, and switches SW1, SW2, and SW3.

In this embodiment, the display 40 is a liquid crystal display (LCD), and the processor 70 is a single chip microcomputer (SCM). The power supply VCC is a 5 volt (5V) direct current (DC) power supply. The switches SW1, SW2 and SW3 are normally off. The clock generator 60 provides a clock signal for the processor 70 and includes a crystal oscillator M, and capacitors C3 and C4. The filter 50 is for stabilizing and smoothing the power supply VCC before the power is supplied to the processor 70. The filter 50 includes a resistor R1, and capacitors C1 and C2.

In another embodiment, the processor 70 can be a digital signal processing (DSP) chip.

A first terminal of the capacitor C1 is connected to the power supply VCC and a second terminal of the capacitor C1 is grounded. The power supply VCC is further grounded through the resistor R1 and the capacitor C2 in series. A node between the resistor R1 and the capacitor C2 is connected to a positive power supply pin VPP of the processor 70. The output pins RA0-RA5 and RC0 of the processor 70 are connected to the display 40 and may display the power P1 and the power P2. The clock pins CLKIN, CLKOUT of the processor 70 are connected to the crystal oscillator M. The terminals of the crystal oscillator are grounded through the capacitor C3 and C4. The input pins RB7 and RB6 are connected to the CPU 90 through a system management bus (SMBUS) which continuously reads the voltage and current supplied to the CPU 90 and to the memory 80, to transmit a voltage U1 and a current I1 (both relating to the CPU 90) to the processor 70. The input pins RB5 and RB4 of the processor 70 are connected to the memory 80 through the SMBUS, to transmit a voltage U2 and a current I2 (both relating to the memory 80) to the processor 70. A positive power supply pin VDD of the processor 70 is connected to the power supply VPP. An input pin RB2 of the processor 70 is grounded through the switch SW2. An input pin RB3 of the processor 70 is grounded through the switch SW1. An input pin RC1 of the processor 70 is grounded through the switch SW3. The negative power supply pins VSS1 and VSS2 of the processor 70 are both grounded.

The switch SW2 is used to start the processor 70. When the switch SW1 is on, the processor 70 is set to measure the power P2 according to the following formula:

$$P2=U2*I2;$$

wherein the parameters P2, U2 and I2 respectively denote the power, the voltage and the current supplied to the memory.

In this embodiment, the CPU 90 and the memory 80 comply with the Intel VR12 power standard. The CPU 90 is capable of connecting to an LGA1156 socket or to an LGA1366 socket through the switch SW3. The load resistance R of the LGA1156 socket is 1.4 ohms and the load resistance R of the LGA1366 is 0.8 ohms. The voltage of the CPU 90 includes a core voltage and a subsidiary voltage. A portion of the core voltage is provided to the LGA1156 socket or to the LGA1366 socket. Therefore, when the switch SW1 is off, the processor 70 may measure the power P1 of the CPU 90 according to the following formula:

$$P1=(U1-R*I1)*I1+U1*I1;$$

Wherein the parameters P1, U1, and I1 respectively denote the power, the voltage and the current supplied to the CPU, R denotes the resistance of the socket.

The measurement device 100 can accurately and efficiently measure the power P1 and the power P2.

The foregoing description of the exemplary embodiments of the disclosure has been presented only for the purposes of illustration and description and is not intended to be exhaustive or to limit the disclosure to the precise forms disclosed. Many modifications and variations are possible. The embodiments explain and illustrate the principles of the disclosure and the practical applications so as to enable others of ordinary skill in the art to utilize the disclosure and various embodiments and with such various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than by the foregoing description and the exemplary embodiments described therein.

What is claimed is:

1. A power measurement device for measuring the power consumed by a central processing unit (CPU) and a memory, the power measurement device comprising:

a processor connected to the CPU to read the voltage and the current supplied to the CPU to calculate the power consumed by the CPU, and connected to the memory to read the voltage and the current supplied to the memory to calculate the power consumed by the memory;

a first switch connected to the processor for setting the processor to measure the power consumed by the CPU or the power consumed by the memory; and a display for displaying the power consumed by the CPU and the power consumed by the memory;

wherein a first positive power supply pin of the processor is connected to a power supply, a first and a second negative power supply pins of the processor are grounded, a first to a seventh output pins of the processor connected to the display, a first and a second input pins of the processor are connected to the CPU, a third and a fourth input pins of the processor are connected to the memory, a fifth input pin of the processor is grounded through the first switch.

2. The power measurement device of claim 1, wherein the display is a liquid crystal display.

3. The power measurement device of claim 1, further comprising a second switch connected to the processor to turn on the processor.

4. The power measurement device of claim 1, further comprising a filter for stabilizing the power supply powering the processor.

5. The power measurement device of claim 4, wherein the filter comprises a resistor, a first and a second capacitors, a first terminal of the first capacitor is connected to the power supply and a second terminal of the first capacitor is grounded, the power supply is further grounded through the resistor and the second capacitor connected in series, a node between the resistor and the second capacitor is connected to a second positive power supply pin of the processor.

6. The power measurement device of claim 4, further comprising a clock generator providing a clock signal for the processor, wherein the clock generator comprises a crystal oscillator, a first and a second capacitors, a first terminal of the crystal oscillator is connected to a clock input pin of the processor, and further grounded through the first capacitor, a second terminal of the crystal oscillator is connected to a clock output pin of the processor, and further grounded through the second capacitor.

7. The power measurement device of claim 1, further comprising a second switch connected to the processor, the CPU connects with a LGA1156 socket when the second switch is on, the CPU connects with a LGA1366 socket when the second switch is off.

8. The power measurement device of claim 7, wherein the power of the CPU is obtained from the formula:

$$P=(U-R*I)*I+U*I;$$

wherein the parameters P, U, and I respectively denote the power, the voltage and the current supplied to the CPU, R denotes the resistance of the socket.

9. The power measurement device of claim 1, wherein the power of the memory is obtained from the formula:

$$P=U*I;$$

wherein the parameters P, U and I respectively denote the power, the voltage and the current supplied to the memory.

10. The power measurement device of claim 1, wherein the CPU and the memory connected to the processor through a system management bus (SMBUS).

11. The power measurement device of claim 1, wherein the processor is a digital signal processing (DSP) chip or a single chip microcomputer (SCM).

12. A power measurement device for measuring the power consumed by a central processing unit (CPU) and a memory, the power measurement device comprising:
 a processor connected to the CPU to read the voltage and the current supplied to the CPU to calculate the power consumed by the CPU, and connected to the memory to read the voltage and the current supplied to the memory to calculate the power consumed by the memory;
 a first switch connected to the processor for setting the processor to measure the power consumed by the CPU or the power consumed by the memory;
 a display for displaying the power consumed by the CPU and the power consumed by the memory; and
 a second switch connected to the processor, wherein the CPU connects with a LGA1156 socket when the second switch is on, and the CPU connects with a LGA1366 socket when the second switch is off.

13. The power measurement device of claim 12, wherein the power of the CPU is obtained from the formula:

$P=(U-R*I)*I+U*I$; wherein the parameters P, U, and I respectively denote the power, the voltage and the current supplied to the CPU, R denotes the resistance of the socket.

14. The power measurement device of claim 13, wherein the power of the memory is obtained from the formula:

$$P=U*I;$$

wherein the parameters P, U and I respectively denote the power, the voltage and the current supplied to the memory.

15. The power measurement device of claim 14, wherein the CPU and the memory connected to the processor through a system management bus (SMBUS).

16. The power measurement device of claim 15, wherein the processor is a digital signal processing (DSP) chip or a single chip microcomputer (SCM).

* * * * *